UNITED STATES PATENT OFFICE.

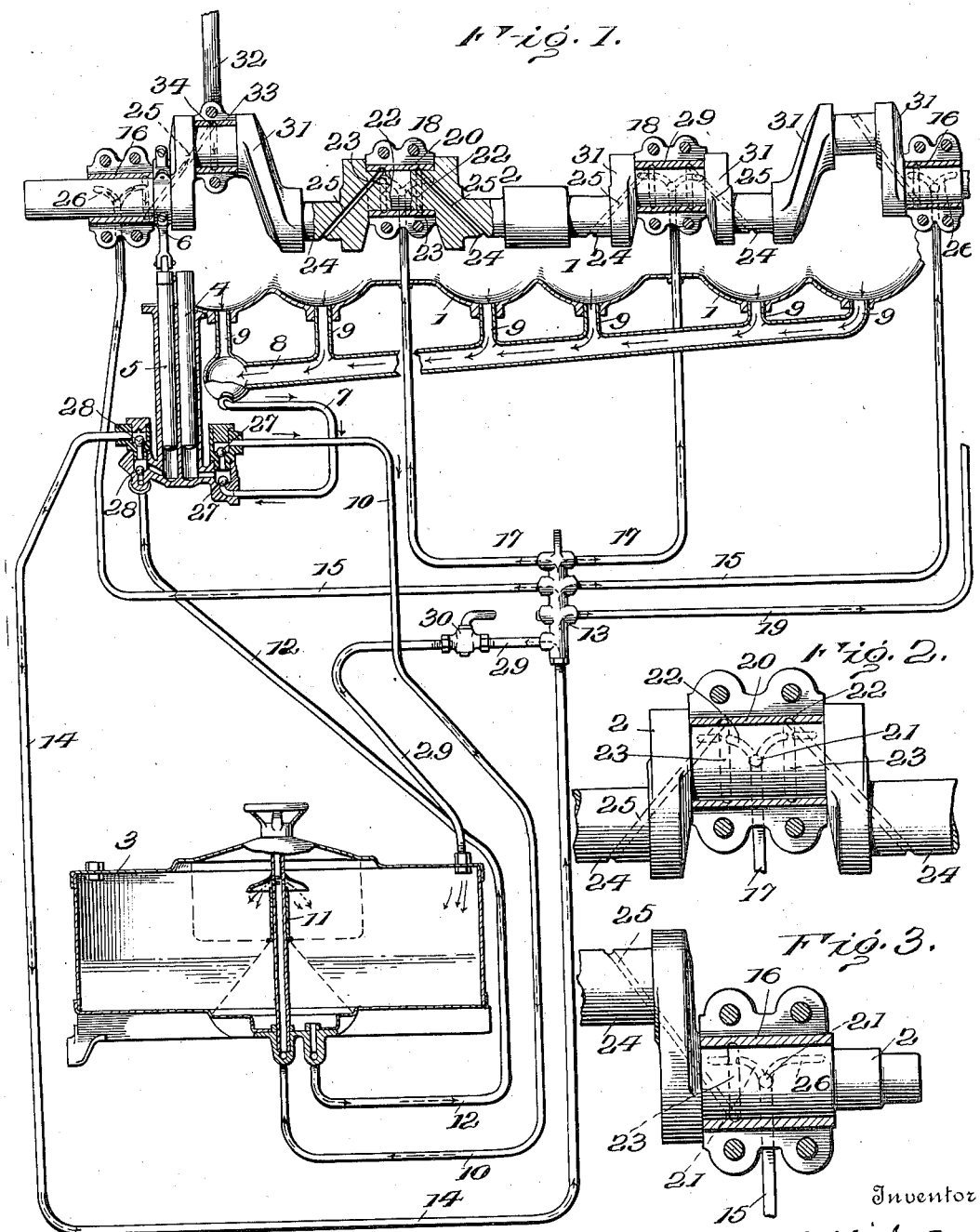

ALEXANDER WINTON, OF CLEVELAND, OHIO.

LUBRICATING SYSTEM FOR AUTOMOBILE-ENGINES.

1,090,773.

Specification of Letters Patent. Patented Mar. 17, 1914.

Application filed March 9, 1912. Serial No. 682,674.

*To all whom it may concern:*

Be it known that I, ALEXANDER WINTON, a citizen of the United States, residing at Cleveland, in the county of Cuyahoga and State of Ohio, have invented certain new and useful Improvements in Lubricating Systems for Automobile-Engines, of which the following is a specification, reference being had therein to the accompanying drawing.

This invention relates to improvements in lubricating systems for automobile engines, and is particularly intended for the explosive type of engine.

The type of lubricating system here shown is disclosed in Patent No. 925,258 of June 15th 1909, granted to myself and Harold B. Anderson, and it will not be necessary to explain, to any great extent, those features of the system which are fully described in the said patent, further than is required for an understanding of the present improvement.

The type of system disclosed in this application and in the said patent is a circulating system in which there are two pumps, a relatively large one for taking the oil from a drip pipe below the engine crank case and carrying it to a reservoir, and a relatively small pump which takes the oil from the reservoir and delivers it to the points to be lubricated, thereby preventing any accumulation of oil in the crank case and preventing the crank case from in any sense acting as an oil chamber.

My present improvement relates to the arrangement of the oil passages or ducts in the main bearings of the crank shaft in connection with the forced feed supply to said main bearings and the ducts or passages from the said main bearings to the crank shaft connecting rod bearings.

In the accompanying drawings, Figure 1 is a view of the oiling system with my improvement applied thereto, the position of the parts being diagrammatically shown. Fig. 2 is an enlarged view of two of the crank shaft and connecting rod bearings, showing the arrangement of the oil duct or passages. Fig. 3 is an enlarged sectional view of one of the crankshaft end bearings, the oil grooves being shown in dotted lines.

Referring now to the drawings in which like reference characters denote the same parts, 1 is the crank case bottom and 2 the crank shaft of the engine.

3 is an oil reservoir or chamber into which the oil is delivered by the pump 4, and from which it is taken and carried to the delivery points by a pump 5. These pumps 4 and 5 have their upper ends connected together and are uniformly actuated by an eccentric sleeve 6, which is connected therewith. By this arrangement the pumps are reciprocated in unison. The pump 4 is of larger capacity than the pump 5 and this pump takes the oil through a pipe 7 from a drip pipe 8. This drip pipe 8 is located below the crank case bottom 1 and communicates therewith through the pipes 9. As shown the drip pipe 8 is at an inclination so that all the oil therein flows to that end to which the pipe 7 is connected. The oil taken from the drip pipe 8 is delivered to the reservoir 3 through a pipe 10 which communicates with the upper portion of the reservoir through a pipe 11. Oil is taken from the reservoir 3, by the pump 5 through a pipe 12 and delivers the oil to a distributing head 13 through a pipe 14. The pipes 15 connect the distributing head 13 with the two end openings 16 of the crank shaft, and the pipes 17 connect the distributing head 13 with the two intermediate crank shaft bearings 18, while the pipe 19 connects the distributing head with the gear train (not shown).

Referring now to the intermediate crank shaft bearings 18, it will be observed that the pipes 17 connect with the bearing bushings 20, through openings 21, and that the bearing bushings have laterally extending grooves 22, which have their ends communicating with the circular grooves 23. This arrangement of grooves in the bearing bushings, provides efficient lubrication for the bearings and lubrication for the adjacent connecting rod bearings 24 is furnished by an oil passage 25 made diagonally through the crank shaft 2 and connecting the annular grooves 23 with the connecting rod bearing surface 24.

Referring now to the end bearings 16, it will be observed that the oil groove arrangement for these bearings differs from the arrangement for the intermediate bearings only in omitting one of the annular grooves 23 for the outer forked grooves 26.

Suitable check valves 27 are provided for the pump 4 and ball check valves 28 are provided for the pump 5, the operation of which is so well understood that any description thereof is unnecessary.

Connected with the distributing head 13 is a bypass pipe 29 having a valve 30. By means of this arrangement any desired quantity of oil fed to the distributing head 13 can be shunted or bypassed to the reservoir through the pipe 29 and in this way the amount of oil supplied through the pipes 15, 17 and 19 by the pump 5 can be controlled by setting the valve 30 to bypass more or less oil to the reservoir 3, owing to the fact that the bypass pipe 29 is connected to the distributing head 13 at a point between the oil supply pipes and the pump 5. By means of this construction less oil can be supplied to the bearings than the pump capacity of the pump 5, or the full pumping capacity of the pump 5 may be caused to flow to the bearing points by closing the valve 30.

As stated in the beginning of this description, the pump 4, which takes the oil from the drip pipe 8 is larger and has greater pumping capacity than the pump 5, which feeds oil to the bearings. By reason of this arrangement, it is impossible for any oil to accumulate in either the crank case bottom or the drip pipe 8, because the pump 4 will take the oil from the drip pipe faster than it is possible for the relatively smaller pump 5 to carry it to the bearing points. In addition to the difference in the pumping capacity of the two pumps, there is some consumption of the oil in lubricating the bearings, which is never recovered and when that is added to the difference in the pumping capacities of the two pumps, it will be seen that it is not possible to have any accumulation of oil in the crank case bottom.

In this system the oil is intended to be supplied to the bearings when under pressure and has, therefore, somewhat of a flushing action, thus providing a rapid lubrication which will prevent any clogging of the oil ducts, and such ample lubrication that there will be no heating of the bearings. Whatever oil falls from these bearings into the crank case bottom 1, immediately flows to a drip pipe 8 through the pipes 9, thus preventing any accumulation of the oil in the crank case bottom, but furnishing sufficient oil so that it runs on the crank arms 31 of the crank shaft and the movement of these crank arms will throw some of the oil from the crank arms up to the cylinders (not shown) for lubricating the pistons (not shown). The oil being fed to the crank shaft bearings under pressure, it is caused to flow into the circular grooves 23, and from them into the oil ducts 25 and supply lubrication for the connecting rod bearings 24.

I have shown a portion of only one of the connecting rods 32 and, therefore, only one connecting rod bearing bushing 33. These connecting rod bearing bushings are provided with annular grooves, as shown at 34, which communicate with the ends of the oil ducts 25.

Having thus described my invention, what I claim and desire to secure by Letters Patent is:

1. A lubricating system for engines, comprising a crank shaft bearing, the shaft having crank arms at each side of the said bearing, grooves arranged on the surface of the said bearing adjacent the moving part, forming channels therebetween, each of the said crank arms having a diagonally arranged oil duct, one end of each duct communicating with one of the annular grooves, the other located at the connecting rod bearing, a supply port in communication with the said annular grooves, and means for supplying oil under pressure to the said supply port.

2. A lubricating system for engines, comprising a crank shaft bearing, the shaft having crank arms at each side of the said bearing, annular grooves arranged on the surface of the said bearing adjacent the moving part and forming channels therebetween each of the said crank arms having a diagonally arranged oil duct, one end of each duct communicating with one of the annular grooves, the other located at the connecting rod bearing, a groove on the crank shaft bearing connecting the said annular grooves, a supply port in communication with the grooves on the said bearing, and means for supplying oil under pressure to the said supply port.

3. A lubricating system for engines, comprising a crank shaft bearing, the shaft having crank arms at each side of the said bearing, annular grooves arranged on the surface of the said bearing adjacent the moving part and forming channels therebetween, lateral grooves on the said bearing connecting the said annular grooves, a supply port in communication with the said lateral grooves, each of the crank arms having a diagonally arranged oil duct, one end of each duct communicating with one of the annular grooves, the other located at the connecting rod bearing, and means for supplying oil under pressure to the said supply port.

4. A lubricating system for engines, comprising a crank shaft bearing, the shaft having crank arms at each side of the said bearing, grooves arranged on the surface of the said bearing adjacent the moving part, the said grooves forming channels between the two coöperating parts, each of the said crank arms having a diagonally arranged oil duct, one end of each duct communicating with one of the grooves, the other located at the connecting rod bearing, a supply port in communication with the said annular grooves and means for supplying oil under pressure to the said supply port.

In testimony whereof I hereunto affix my signature in the presence of two witnesses.

ALEXANDER WINTON.

Witnesses:
 HAROLD B. ANDERSON,
 W. J. WARD.